United States Patent
Rautenbach et al.

(10) Patent No.: US 6,595,001 B2
(45) Date of Patent: Jul. 22, 2003

(54) METHOD FOR UTILIZATION OF A METHANE-CONTAINING GAS

(75) Inventors: Robert Rautenbach, deceased, late of Sprockhövel (DE), by Christine Rautenbach, executor; Suleyman Yuce, Aachen (DE); Joachim Gebel, Aachen (DE); Alexander Schmitt, Krefeld (DE)

(73) Assignee: G.A.S. Energietechnologie GmbH, Krefeld (DE)

( * ) Notice: Subject to any disclaimer, the term of this patent is extended or adjusted under 35 U.S.C. 154(b) by 0 days.

(21) Appl. No.: 09/957,962

(22) Filed: Sep. 21, 2001

(65) Prior Publication Data

US 2002/0069754 A1 Jun. 13, 2002

(30) Foreign Application Priority Data

Sep. 23, 2000 (DE) .......................... 100 47 262

(51) Int. Cl.[7] .................................. F02C 1/00
(52) U.S. Cl. ............................ 60/772; 95/45; 123/527
(58) Field of Search ................. 60/772, 39.12, 60/780, 781; 95/45, 47, 54; 123/1 A, 527, 557, 25 A

(56) References Cited

U.S. PATENT DOCUMENTS

| | | | | |
|---|---|---|---|---|
| 5,300,819 A | * | 4/1994 | Lee | 307/47 |
| 5,709,732 A | * | 1/1998 | Prasad | 95/45 |
| 6,033,207 A | * | 3/2000 | Cummings | 431/11 |
| 6,298,652 B1 | * | 10/2001 | Mittricker et al. | 60/39.02 |
| 6,340,005 B1 | * | 1/2002 | Keast et al. | 123/27 GE |
| 6,387,157 B1 | * | 5/2002 | Yamashita | 95/45 |

FOREIGN PATENT DOCUMENTS

| | | | | |
|---|---|---|---|---|
| DE | 4117829 A | * | 12/1992 | |
| DE | 41 17 829 | | 12/1992 | |
| DE | 195 43 884 | | 7/1997 | |
| JP | 11-169827 | * | 6/1999 | |
| JP | 2000152799 A | * | 6/2000 | |

* cited by examiner

*Primary Examiner*—Charles G. Freay
*Assistant Examiner*—Han L. Liu
(74) *Attorney, Agent, or Firm*—Collard & Roe, P.C.

(57) ABSTRACT

A method of utilizing a methane-containing gas by feeding the methane-containing gas to a gas engine of a gas engine/generator assembly generating electricity comprises the step of passing combustion air containing an inert gas through a membrane separating installation to reduce the content of the inert gas before feeding the combustion air to the gas engine.

6 Claims, 3 Drawing Sheets

METHOD FOR UTILIZATION OF A METHANE-CONTAINING GAS

BACKGROUND OF THE INVENTION

1. Field of the Invention

The present invention relates to a method for utilizing a methane-containing gas, which may be selected from the group consisting of pit gas, waste dump gas and biogas originating from fermentation installations and putrefication processes of sewage treatment plants, by feeding the methane-containing gas to a gas engine of a gas engine/generator assembly generating electricity.

2. Description of the Prior Art

It is known to install gas engine/generator assemblies in waste dumps and to operate the gas engine with waste dump gas. The waste dump gas sucked out of the waste has a content of about 50%, by volume, of methane. The remainder is comprised substantially of $CO_2$ and some nitrogen. When the waste dump is closed, the production of biogas from the waste is slowly reduced over a period of about 10 years. The installed gas catching system then increasingly sucks air into the waste so that the methane content is reduced. When the methane content is reduced below 40%, by volume, it is impossible to operate the gas engine, and the waste dump gas must be burned off.

Pit gas is a gas consisting essentially of methane diluted by ventilation with air. The methane content of pit gas ranges from 30% to 50%, by volume, operating variations being unavoidable. When the methane content falss below 40%, by volume, gas engines fed by such a gas must be disconnected, and such a pit gas can no longer be used for generating electricity.

SUMMARY OF THE INVENTION

It is the primary object of this invention to make methane-containing gases, whose methane content is around or below 40%, by volume, useful as a fuel for gas engines to generate electricity.

According to the invention, this and other objects are accomplished in a method of the first-described type by passing combustion air containing an inert gas through a membrane separating installation to reduce the content of the inert gas before feeding the combustion air to the gas engine operated by the methane-containing gas.

By arranging a membrane separating installation downstream of the gas engine, the oxygen/nitrogen ratio in the combustion air fed to the gas engine is changed, i.e. the combustion air contains more oxygen and correspondingly less inert nitrogen. This reduction in the inert gas content of the combustion air compensates for the higher inert gas content in the methane-containing gas fed to the gas engine so that the gas engine may be operated under optimal conditions. This makes it possible to operate with so-called lean gases containing less than 40%, by volume, of methane an correspondingly higher contents of inert components, such as $CO_2$ and/or nitrogen.

According to a preferred embodiment, the membrane separating installation comprises a gas permeation module with a membrane having a preferred permeability for oxygen, and condensed atmospheric air is fed to the gas permeation module to obtain a permeate whose inert gas content is reduced compared to that of the atmospheric air, and the permeate coming from the gas permeation module is fed as combustion air to the gas engine. Obviously, depending on the amount of combustion air and the desired reduction of nitrogen (inert gas), several gas permeation modules may be connected in parallel and/or in series.

The operation of the membrane separation installation may be so controlled that the oxygen/nitrogen ratio in the combustion air assures an optimal air ratio in the operation of the gas engine from a motor-technical and exhaust gas-technical point of view when the methane content of the methane-containing gas fed to the gas engine is less than 40%, by volume.

Preferably, the gas engine is operated with an air ratio $\lambda=1.5$ to 1.8, most advantageously an air ratio $\lambda=1.6$. Conventional gas engines may be operated at such an air ratio with a high engine efficiency and small exhaust gas emissions.

BRIEF DESCRIPTION OF THE DRAWING

The above and other objects, advantages and features of the present invention will become more apparent from the following detailed description of now preferred embodiments thereof, taken in conjunction with the accompanying drawing wherein.

DETAILED DESCRIPTION OF THE PREFERRED EMBODIMENTS

Figure 1:
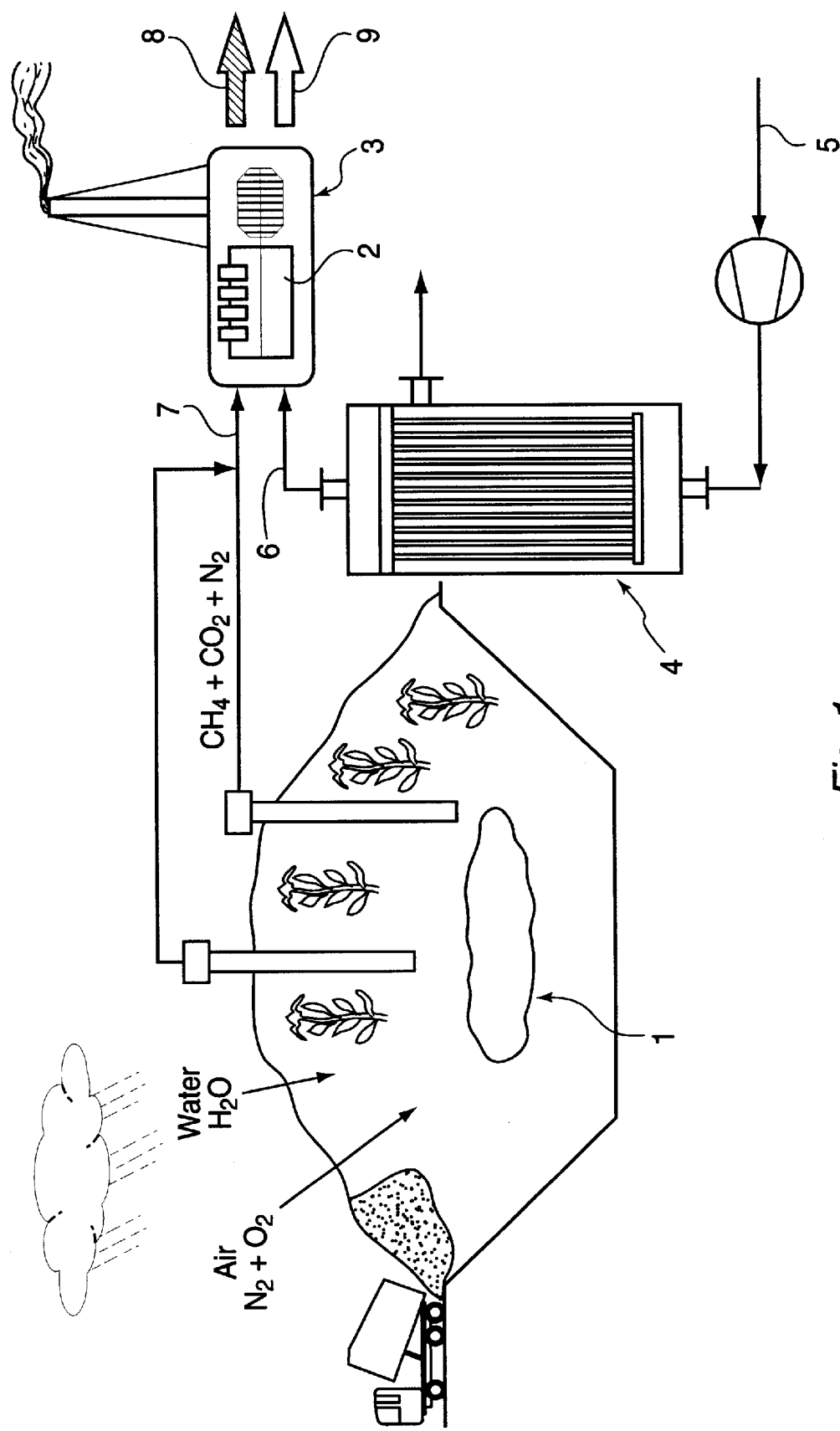
FIG. 1 illustrates the method with the use of waste dump gas.
Figure 2:
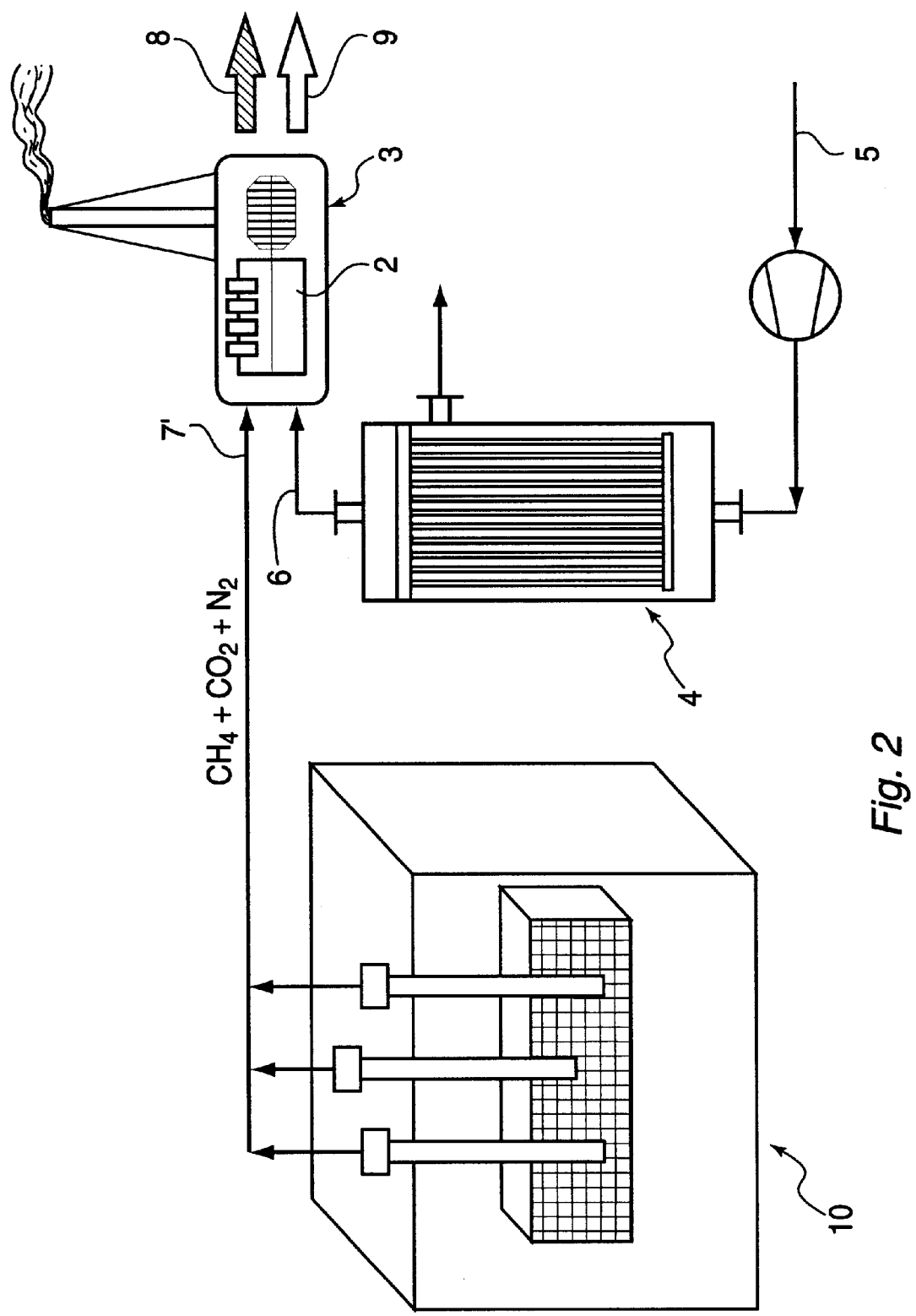
FIG. 2 illustrates the method with the use of pit gas.

FIGS. 1 and 2 illustrate the method of utilizing a methane-containing gas by feeding the methane-containing gas as fuel to a gas engine 2 of a gas engine/generator assembly 3 generating electricity. Combustion air 5 containing an inert gas (nitrogen) is passed through a membrane separating installation 4 to reduce the content of the inert gas before feeding the combustion air to gas engine 2. The methane-containing gas may be a lean gas containing less than 40%, by volume, of methane. The membrane separating installation causes a reduction of the inert gas fed to gas engine 2. It comprises a gas permeation module with a membrane having a preferred permeability for oxygen, and as shown in FIGS. 1 and 2, condensed atmospheric air is fed to the gas permeation module to obtain a permeate whose inert gas content is reduced compared to that of atmospheric air 5, and permeate 6 coming from the gas permeation module is fed as combustion air to gas engine 2.

In the embodiment of FIG. 1, the lean gas is waste dump gas 7 sucked out of waste dump 1. It is comprised essentially of methane, $CO_2$ and nitrogen. In the embodiment of FIG. 2, the lean gas is pit gas 7', which is comprised essentially of $CH_4$, $O_2$ and $N_2$. The pit gas is diluted with air by ventilating the shafts of coal mine 10, which may lead to a reduction of the methane content of the pit gas to less than 40%, by volume. Operating variations of the pit gas components are unavoidable.

Figure 3:
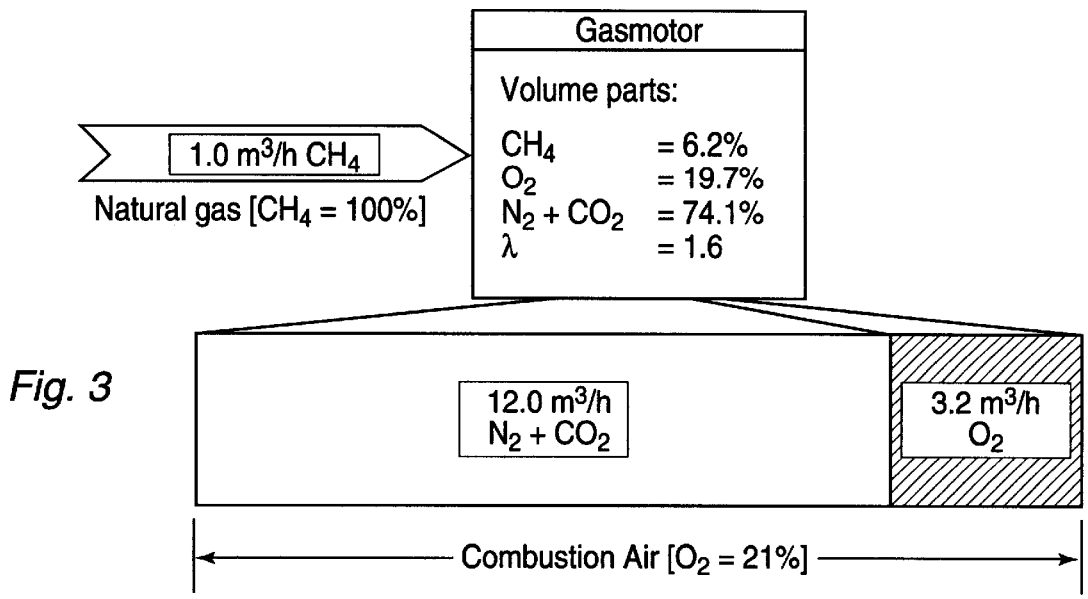
FIG. 3 shows the balance of components in a gas engine operated with natural gas.
Figure 4:
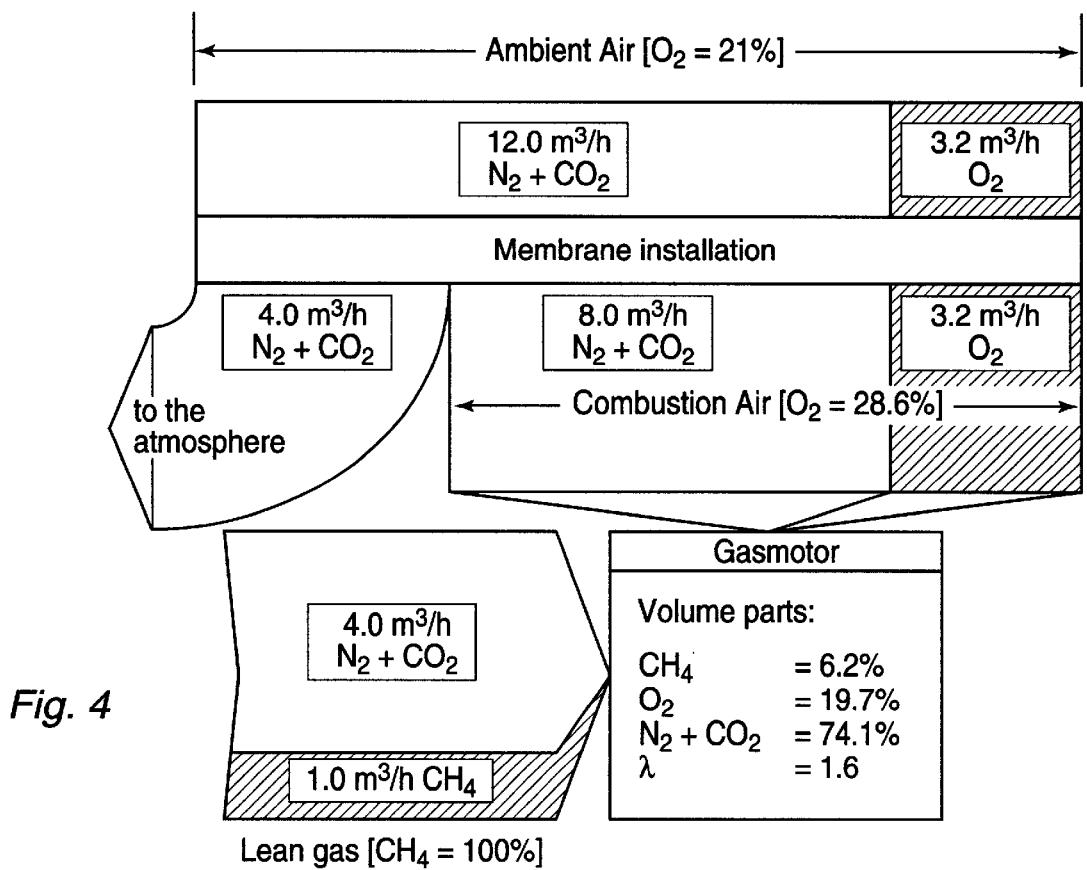
FIG. 4 shows the balance of components in a gas engine operated with waste dump gas.

As the balance of components shown in FIGS. 3 and 4 shows, the operation of membrane separation installation 4 may be so controlled that the oxygen/nitrogen ratio in combustion air 6 assures an optimal air ratio in the operation of gas engine 2 from a motor-technical and exhaust gas-technical point of view when the methane content of methane-containing gas 7 or 7' fed to the gas engine is less than 40%, by volume.

FIG. 3 shows the balance of components of a gas engine operated with natural gas at an air ratio of λ=1.6, which is optimal from a motor-technical and exhaust gas-technical point of view. This assumes a feed of 1.0 m³/h of $CH_4$ in the form of natural gas and 15.2 m³/h of combustion air to gas engine 2. If the ambient air contains 21%, by volume, of oxygen, this produces a feed of 3.2 m³/h of oxygen to the gas engine, the remainder being inert gas in the form of nitrogen and $CO_2$. This results in a combustion gas/air mixture in gas engine 2 of the following composition, by volume:

$CH_4$=6.2%

$O_2$=19.7%

$N_2$+$CO_2$=74.1%

In the balance of components shown in FIG. 4, the gas engine is fed by 5 m³/h of a lean gas containing only 20%, by volume, of methane, with an inert gas portion of 4.0 m³/h. The combustion in the gas engine requires 3.2 m³/h of oxygen, which is supplied with the combustion air. Providing the membrane separating installation according to this invention controls the oxygen/inert gas ratio of the combustion air so that the gas engine may be operated with an air ratio λ=1.6. This result is obtained by removing 4.0 m³/h of inert gas in the membrane separating installation.

FIGS. 3 and 4 show that a reduction of the inert gas in the combustion air supplied to the gas engine may compensate for a high content of inert gas in the methane-containing gas.

Several gas permeation modules may be connected in parallel and/or in series, depending on the required amount of combustion air and variations in the oxygen/nitrogen ratio. Experiments with a 50 kW-gas engine operated with waste dump gas have shown that full efficiency can be obtained with the method of the invention, even with a methane content of only 25%, by volume.

The gas permeation modules may be commercially available modules with membrane coils, hollow filament membranes or capillary membranes. The membrane material may be, for example, polysulfones, particularly with a coating of silicone, polyethersulfone, polyimide, cellulose acetate, or the like. Such materials have a preferred permeability for $CO_2$ and $O_2$ and only a low permeability for $N_2$.

The generated electric current 8 may be supplied to a current network and any co-generated heat 9 may also be utilized.

As is evident from the above, a highly efficient operation of gas engine/generator assembly 3 may be obtained with the method of the present invention with a gas containing relatively low amounts of methane, making it possible, for example, to prolong the operation after a waste dump has been closed and the methane production generated is progressively reduced, as well as with pit gas generated in coal mines, which have a low methane content, without requiring any changes in the ventilation. The method is effective independently of variations in the gas composition, and is equally useful with biogas originating from fermentation installations and putrefaction processes of sewage treatment plants.

What is claimed is:

1. A method of utilizing a lean gas containing less than 40%, by volume, of methane by feeding the methane-containing gas to a gas engine of a gas engine/generator assembly generating electricity, comprising the step of passing combustion air containing an inert gas through a membrane separating installation to reduce the content of the inert gas before feeding the combustion air to the gas engine in order to compensate for an increase of the content of inert gas in the methane-containing gas independently of variations in the gas composition.

2. The method of claim 1, wherein the methane-containing gas is selected from the group consisting of pit gas, waste dump gas and biogas originating from fermentation installations and putrefaction processes of sewage treatment plants.

3. The method of claim 1, wherein the membrane separating installation comprises a gas permeation module with a membrane having a preferred permeability for oxygen, comprising the further steps of feeding condensed atmospheric air to the gas permeation module to obtain a permeate whose inert gas content is reduced compared to that of the atmospheric air, and feeding the permeate coming from the gas permeation module as combustion air to the gas engine.

4. The method of claim 3, comprising the step of controlling the operation of the membrane separation installation so that the oxygen/nitrogen ratio in the combustion air assures an optimal air ratio in the operation of the gas engine from a motor-technical and exhaust gas-technical point of view when the methane content of the methane-containing gas fed to the gas engine is less than 40%, by volume.

5. The method of claim 4, wherein the gas engine is operated with an air ratio λ=1.5 to 1.8.

6. The method of claim 5, wherein the air ratio λ=1.6.

* * * * *